United States Patent Office 2,852,521
Patented Sept. 16, 1958

2,852,521

10,11-DIHYDROXY AND 10,11-EPOXY-9,12-DIKE-TOSTEARIC ACID AND DERIVATIVES

Joseph Nichols, Princeton, N. J., assignor to Ethicon, Inc., a corporation of New Jersey No Drawing. Application July 1, 1957
Serial No. 668,878

8 Claims. (Cl. 260—295)

This invention relates to 9,12-diketo-10,11-epoxystearic acid and 9,12-diketo-10,11-dihydroxystearic acid and salts thereof and has among its objects the production of such compounds.

My U. S. Patent No. 2,623,889, December 30, 1952, discloses the oxidation of 12-ketooleic acid and 12-ketoelaidic acid and esters of the acids with chromic acid to produce a diketo-octadecenoic acid, having an empirical formula of $C_{18}H_{30}O_4$ and a melting point of 112° C. to 113° C. The oxidation was carried out by means of excess chromic acid over that required to oxidize a methylene group in the molecule, approximately 400% excess being preferred for the best yields. The solvent medium was glacial acetic acid in an amount in excess of that required for a single phase reaction medium and excess free sulfuric acid was also present in an amount of at least about three times as much as required to form chromic acid from the soluble dichromate present in the reaction mixture. It was originally believed that the carbon-carbon double bond in the diketo-octadecenoic acid prepared by the oxidation was in the 9,10 position, but it has been since shown that the position of the carbon double bond is 10,11.

I have now discovered that 9,12-diketo-10,11-epoxystearic acid having the formula

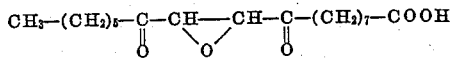

and 9,12-diketo-10,11-dihydroxystearic acid having the formula

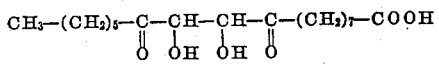

may be prepared by the oxidation of 9,12-diketo-10,11-octadecenoic acid with hydrogen peroxide. Oxidation with hydrogen peroxide leading to the production of 9,12-diketo-10,11-epoxystearic acid is conducted in an alkaline medium at a low temperature and is preferably conducted at a temperature not above —5° C. in the presence of magnesium chloride which acts as a catalyst. Oxidation with hydrogen peroxide leading to the production of 9,12-diketo-10,11-dihydroxystearic acid is conducted in a neutral or slightly acidic medium and preferably at a temperature not exceeding 70° C. in the presence of a catalytic amount of osmium tetroxide.

For the purpose of illustrating my invention Examples 1 to 3 are set forth below in order to show the methods of preparing 9,12-diketo-10,11-epoxystearic acid and 9,12-diketo-10,11-dihydroxystearic acid by the oxidation of 9,12-diketo-10,11-octadecenoic acid with hydrogen peroxide. I wish it to be understood, however, that these examples are set forth by way of illustration and not by way of limitation.

EXAMPLE 1

*Preparation of 9,12-diketo-10,11-epoxystearic acid*

A solution of 38 grams of potassium hydroxide in 166 milliliters of water and 420 milliliters of methanol and a solution of 174 milliliters of 30% hydrogen peroxide were added simultaneously over a period of one-quarter hour to a stirred solution of 100 grams of 9,12-diketo-10,11-octadecenoic acid, 19 grams of potassium hydroxide, and four grams of magnesium chloride in 8 liters of methanol. The temperature of the reaction mixture was kept at —5° C. during the addition. After the addition was complete, the reaction mixture was stirred at room temperature for one and one-half hours and then maintained at 0° C. for one hour. The solution was acidified with 10 liters of 0.10-Normal hydrochloric acid and sufficient water was added to bring the volume to 40 liters. A white precipitate was formed and was removed from the reaction mixture, washed with water and recrystallized from 95% ethanol. 45 grams of the product having a melting point of 100° C. were obtained. Carbon and hydrogen analyses gave the following results; calculated for $C_{18}H_{30}O_5$; carbon equals 66.23%, hydrogen equals 9.26%; found, carbon equals 66.31% and hydrogen equals 9.17%.

EXAMPLE 2

*Preparation of 9,12-diketo-10,11-dihydroxystearic acid*

A stirred slurry of 5.6 grams of 9,12-diketo-10,11-octadecenoic acid and 30 milliliters of a reagent solution containing 5% to 5.1% hydrogen peroxide in anhydrous tertiary butyl alcohol was heated slightly and five milliliters of a 1% ethereal solution of osmium tetroxide were added. Heating was discontinued and a spontaneous exothermic reaction ensued. The temperature of the reaction mixture was allowed to reach 70° C. and then kept at that temperature or below by the application of cooling means until the reaction had subsided. The brown reaction mixture was allowed to come to room temperature and to remain at room temperature for 12 hours. The solvents were removed from the reaction mixture under reduced pressure, and 100 cc. of water was added with good stirring to solidify the reaction product. The brown solid reaction product was dissolved in a minimum amount of 70% ethanol, decolored with animal charcoal, and allowed to cool and crystallize. The crystallized material was filtered from the solvent and recrystallized in absolute ether. 1.2 grams of 9,12-diketo-10,11-dihydroxystearic acid, having a melting point of 103° C. to 104° C. were obtained. Carbon and hydrogen analyses gave the following results; calculated for $C_{18}H_{32}O_6$, carbon equals 62.67%, hydrogen equals 9.37%; found, carbon equals 62.64% and hydrogen equals 9.16%.

EXAMPLE 3

*Preparation of 9,12-diketo-10,11-dihydroxystearic acid*

Seventy-five milliliters of 90% hydrogen peroxide and 125 milliliters of a 1% ethereal solution of osmium tetroxide were added consecutively to a stirred suspension of 50 grams of 9,12-diketo-10,11-octadecenoic acid and two liters of absolute ether. The reaction mixture was maintained at 0° C. during the addition. After the addition was completed, the temperature of the reaction mixture was allowed to rise slowly to room temperature and the reaction mixture was stirred for three hours, at which time all of the suspended material had dissolved. The solution was maintained at 0° C. for 12 hours and the white precipitate formed during this time was removed. The filtrate was concentrated to one-half its original volume under reduced pressure and then diluted with four liters of petroleum ether (boiling point 30° C. to 60° C.) and then cooled to —20° C. A solid precipitate was formed and was removed from the solution and combined with the original precipitate. The combined precipitates were washed with water and recrystallized from 90% ethanol. 31.2 grams of 9,12-diketo-10,11-dihydroxystearic acid, were obtained.

Both 9,12-diketo-10,11-epoxystearic acid and 9,12-diketo-10,11-dihydroxystearic acid may be readily converted into salts having substantially more solubility in water than the free acid. Salts prepared by reacting the acid with inorganic bases, such as sodium, potassium and ammonium hydroxide, as well as organic amines such as diethanol amine, triethanol amine, pyridine, and primary, secondary, and tertiary aliphatic amines in general have solubility in water several times greater than the free acid.

As an example thereof 344 parts of 9,12-diketo-10,11-dihydoxystearic acid-ethyl alcohol solution were reacted with 56.1 parts of an ethyl alcohol solution of potassium hydroxide, yielding 382 parts of 9,12-diketo-10,11-dihydroxystearic acid potassium salt after removal of the solvent. This had a considerably greater solubility in water than the free acid.

Similarly, 326 parts of 9,12-diketo-10,11-epoxystearic acid in ethyl alcohol solution were reacted with 56.1 parts of potassium hydroxide in ethyl alcohol solution, yielding 364 parts of the 9,12-diketo-10,11 epoxystearic acid potassium salt after removal of the solvent. It has a considerably greater solubility in water than the free acid. When the stoichiometric amounts of sodium hydroxide, ammonium hydroxide, diethanolamine, triethanolamine and pyridine are reacted with 9,12-diketo-10,11-epoxystearic and 9,12-diketo-10,11-dihydroxystearic acid, respectively, the resulting salts are formed and these salts have considerably greater solubility in water than the free acid.

The novel acids, 9,12-diketo-10,11-epoxystearic acid and 9,12-diketo-10,11-dihydroxystearic acid, and their salts may be used for a number of different purposes in a wide variety of fields. They may be employed as intermediates in further chemical syntheses or as finished products. In the latter category, they find use in the inhibition of the growth of microorganisms, and particularly fungi and mycobacteria. As intermediates, the acids may be reacted with alcohols to make esters, or converted into amides.

0.2 part of beta-dimethylaminoethyl-9,12-diketo-10,11-epoxystearate was prepared by reaction of 5.4 parts of dimethylaminoethanol with the mixed anhydride prepared from 9.78 salts of 9,12-diketo-10,11-epoxystearic acid and 4.11 parts of isobutylchloroformate as disclosed in copending application Ser. No. 506,356, filed May 5, 1955, by Nichols and Schipper.

Similarly, the mixed anhydride of 9,12-diketo-10,11-epoxystearic acid and isobutylchloroformate was converted to N - beta - diethylamino - ethyl-9,12-diketo-10,11-epoxystearamide by reaction with beta-diethylaminoethylamine, as disclosed in copending application Ser. No. 506,353 filed May 5, 1955, by Nichols and Schipper. That application also discloses the preparation of amides of 9,12-diketo-10,11-dihydroxystearic acid.

EXAMPLE 4

Both compounds prepared according to the foregoing examples were tested for activity against *Mycobacterium tuberculosis* H37R$_a$ and H37R$_v$ according to the method of A. W. Frisch and M. S. Tarshis, American Review of Tuberculosis, vol. 64, page 551 (1951); 9,12-diketo-10,11-dihydroxystearic acid completely inhibited the growth of *Mycobacterium tuberculosis* H37R$_a$ at a concentration of 100 micrograms per milliliter, and completely inhibited the growth of *Mycobacterium tuberculosis* H37R$_v$ at a concentration of 50 micrograms per milliliter, and 9,12-diketo-10,11-epoxystearic acid, completely inhibited the growth of both *Mycobacterium tuberculosis* H37R$_a$ and *Mycobacterium tuberculosis* H37R$_v$ at a concentration of 100 micrograms per milliliter.

The compounds prepared according to the foregoing examples were tested for activity against *Coccidioides immitis*, *Candida albicans* and *Cryptococcus neoformans* by a serial dilution method given by the following procedure:

The compounds were sterilized by exposure to propylene oxide for three days and 0.25 milliliter of sterile aqueous solution containing twenty milligrams of compound per milliliter of solution was added to 4.5 milliliters of sterile Mycophil broth, the broth then being serially diluted with additional sterile broth to provide solutions of five milliliters total volume containing 1000, 500, 100, 10, 1, 0.1, and 0.01 micrograms of compound per milliliter of solution. One milliliter of a seventy-two hour Mycophil broth culture of *Coccidioides immitis*, *Candida albicans* and *Cryptococcus neoformans* were added to ninety-nine milliliter portions of sterile Mycophil broth and 0.2 milliliter portions of the diluted cultures were added to each of the serial dilutions containing the test compounds and the inoculated tubes were incubated at 25° C. for five days. All of the compounds completed inhibited growth of *Coccidioides immitis*, *Candida albicans* and *Cryptococcus neoformans* at a concentration of 1000 micrograms per milliliter.

This application is a continuation-in-part of my application Serial No. 397,483, filed December 10, 1953, now abandoned.

It is apparent that many widely different embodiments of this invention may be made without departing from the spirit and scope thereof; and, therefore, it is not intended to be limited except as indicated in the appended claims.

I claim:

1. A compound comprising a member of the group which consists of 9,12-diketo-10,11-dihydroxystearic acid, 9,12-diketo-10,11-epoxystearic acid, salts of 9,12-diketo-10,11-dihydroxystearic acid, and salts of 9,12-diketo-10,11-epoxystearic acid, said salts being members of the group which consists of sodium, potassium, ammonium hydroxide, pyridine, diethanolamine, and triethanolamine salts of 9,12-diketo-10,11-dihydroxystearic acid, and sodium, potassium, ammonium hydroxide, pyridine, diethanolamine, and triethanolamine salts of 9,12-diketo-10,11-epoxystearic acid.

2. 9,12-diketo-10,11-dihydroxystearic acid.
3. 9,12-diketo-10,11-dihydroxystearic acid sodium salt.
4. 9,12 - diketo-10,11-dihydroxystearic acid potassium salt.
5. 9,12-diketo-10,11-epoxystearic acid.
6. 9,12-diketo-10,11-epoxystearic acid sodium salt.
7. 9,12-diketo-10,11-epoxystearic acid pyridine salt.
8. 9,12-diketo-10,11-dihydroxystearic acid pyridine salt.

No references cited.